(12) United States Patent
Belmonte de Udaondo et al.

(10) Patent No.: US 11,873,798 B2
(45) Date of Patent: Jan. 16, 2024

(54) WIND TURBINE BLADE HAVING AN ICE FORMATION PREVENTION SYTEM AND A LIGHTNING PROTECTION SYSTEM AND METHOD FOR MANUFACTURING THE BLADE

(71) Applicant: Siemens Gamesa Renewable Energy Innovation & Technology S.L., Sarriguren (ES)

(72) Inventors: Esteban Belmonte de Udaondo, Pamplona (ES); Victor March Nomen, Les Fonts (ES); Alberto Echaniz Del Guayo, Pamplona (ES)

(73) Assignee: SIEMENS GAMESA RENEWABLE ENERGY INNOVATION & TECHNOLOGY S.L.

( * ) Notice: Subject to any disclaimer, the term of this patent is extended or adjusted under 35 U.S.C. 154(b) by 0 days.

(21) Appl. No.: 17/557,460

(22) Filed: Dec. 21, 2021

(65) Prior Publication Data

US 2022/0220944 A1 Jul. 14, 2022

(30) Foreign Application Priority Data

Jan. 12, 2021 (EP) .................................... 21382007

(51) Int. Cl.
*F03D 80/30* (2016.01)
*F03D 80/40* (2016.01)
(Continued)

(52) U.S. Cl.
CPC ............ *F03D 80/30* (2016.05); *B29C 70/882* (2013.01); *B29D 99/0025* (2013.01);
(Continued)

(58) Field of Classification Search
CPC ......... F03D 80/40; F03D 80/30; B64D 45/02; B64D 15/12
See application file for complete search history.

(56) References Cited

U.S. PATENT DOCUMENTS 9,341,164 B2 * 5/2016 Lind ........................ F03D 80/40
9,410,533 B2 * 8/2016 Loewe .................... F03D 80/40
(Continued)

FOREIGN PATENT DOCUMENTS

CA 2851598 A1 4/2013
CN 108843523 A * 11/2018 ............. F03D 80/40
(Continued)

OTHER PUBLICATIONS

English translation of CN108843523A (Year: 2018).*
(Continued)

*Primary Examiner* — Igor Kershteyn
*Assistant Examiner* — Wesley Le Fisher
(74) *Attorney, Agent, or Firm* — Schmeiser, Olsen & Watts LLP (57) ABSTRACT

A blade for a wind turbine including heating means connected to power cables, a lightning protection system including a down conductor, and surge protection devices is provided. The heating means include a first radiant element and a second radiant element arranged adjacent to each other around a leading edge of the blade, the first radiant element being connected to the power supply cables through respective electrical connectors at the respective connection points, and the down conductor is connected to each power supply cable at the connection points through the respective surge protection device, the second radiant element being connected to the first radiant element so that the second radiant element is electrically supplied only through the first radiant element.

15 Claims, 4 Drawing Sheets

(51) Int. Cl.
    *B29C 70/88*    (2006.01)
    *B29D 99/00*    (2010.01)
    *B29L 31/08*    (2006.01)

(52) U.S. Cl.
    CPC ........... *F03D 80/301* (2023.08); *F03D 80/40* (2016.05); *F03D 80/401* (2023.08); *B29L 2031/085* (2013.01); *F05B 2230/50* (2013.01); *F05B 2240/85* (2020.08)

(56) References Cited

U.S. PATENT DOCUMENTS

| | | | | |
|---|---|---|---|---|
| 9,415,875 | B2 * | 8/2016 | Stiesdal | F03D 80/40 |
| 9,482,208 | B2 * | 11/2016 | Loewe | F03D 80/40 |
| 9,771,158 | B2 * | 9/2017 | Gilmore | B64D 15/14 |
| 9,797,381 | B2 * | 10/2017 | Iriarte Eleta | F03D 80/40 |
| 10,125,744 | B2 * | 11/2018 | March Nomen | F03D 80/30 |
| 10,202,966 | B2 * | 2/2019 | Lipka | F03D 80/30 |
| 2013/0170992 | A1 | 7/2013 | Loewe et al. | |
| 2015/0098823 | A1 * | 4/2015 | Iriarte Eleta | F03D 80/30 |
| | | | | 416/146 R |
| 2015/0204311 | A1 * | 7/2015 | Clemens | F03D 80/30 |
| | | | | 219/539 |

FOREIGN PATENT DOCUMENTS

| | | | | |
|---|---|---|---|---|
| EP | 2667025 | A1 | 11/2013 | |
| EP | 2857678 | A1 | 4/2015 | |
| EP | 2754891 | B1 | 5/2017 | |
| JP | 2018537612 | A * | 12/2018 | F03D 80/30 |
| WO | 2018/095649 | A1 | 5/2018 | |

OTHER PUBLICATIONS

English translation of JP2018537612A (Year: 2018).*
European Search Report dated Jul. 5, 2021 for application No. 21382007.9.

* cited by examiner

WIND TURBINE BLADE HAVING AN ICE FORMATION PREVENTION SYTEM AND A LIGHTNING PROTECTION SYSTEM AND METHOD FOR MANUFACTURING THE BLADE

CROSS-REFERENCE TO RELATED APPLICATIONS

This application claims priority to EP Application No. 21382007.9, having a filing date of Jan. 12, 2021, the entire contents of which are hereby incorporated by reference.

FIELD OF TECHNOLOGY

The following relates to a blade for a wind turbine and method for manufacturing a blade, in particular, to blades comprising an ice formation prevention system and a lightning protection system.

BACKGROUND

Blades for a wind turbine with ice formation prevention system and a lightning protection system are known in the art. Taking into account that wind turbines and in particular, the blades of these turbines have high probabilities to being struck by a lightning, it is necessary to equipped the blade with a lightning protection system for minimizing the effect of the lightning in the blade, in particular in the electrical elements comprised in the blade and/or in the wind turbine.

On the other hand, the blades including conductive metal sheets in external laminate of the blade, in particular in the area of the leading edge, are known for preventing the formation of ice which adversely affects the efficiency of the wind turbine.

The presence of ice formation prevention systems in a blade could affect the efficiency of the lightning protection system also. For avoiding such a problem, EP 2857678 A1 describes a protection system that enables to disable the heating mode and enable the lightning protection mode whenever a lightning strike is detected. The protection system includes at least one surge protection device directly connecting the electrodes connected to the conductive sheets of the ice formation prevention system to a lightning down cable of the lightning protection system.

WO 2018/095649 A1 describes a blade comprising a lightning protection system with a down cable for conducting the lightning current received by a receptor to a grounding terminal, and electrically conductive layer arranged on an outer surface of a blade shell, the down cable and the conductive layer being electrically connected by a connecting surge device such that their potential is equalized.

SUMMARY

An aspect relates to a blade for a wind turbine comprising an ice formation prevention system, a lighting protection system, and surge protection devices that connect the ice formation prevention system with the lightning protection system ensuring the equipotentiality of both systems. The ice formation prevention system comprises heating means connected to power supply cables, the lightning protection system including at least one lightning down conductor and configured to conduct the lightning striking the blade to the ground through the lightning down conductor.

The heating means comprise at least one first radiant element and at least one second radiant element arranged faced to each other around a leading edge of the blade, with the first radiant element being connected to the power supply cables through respective electrical connectors at respective connection points. The lightning conductor is connected to each power supply cable at the connection points through the respective surge protection device, with the second radiant element being electrically connected to the first radiant element so that the second radiant element is electrically supplied only through the first radiant element. This way, the ice formation prevention system and the lightning protection system is electrically equipontentialized by the electrical connection between the first radiant element and the second radiant element. Once the first radiant element and the second radiant element are electrically connected not only the second radiant element is electrically powered but also the whole lightning protection system of the blade remains connected and equipontentialized with respect the ice prevention system.

A blade with two independent electrical circuits is obtained, the electrical circuits including the lighting protection system and the ice formation prevention system. Each shell includes one independent electrical circuit, both circuits being connected by connecting the second radiant element to the first radiant element. This way the electrical connections are minimized and optimized.

Another aspect of embodiments of the invention relates to a method for manufacturing the blade of the features described previously. The method comprises the following steps:

depositing in a first mold a plurality of layers or sheets of fabric which will form the bottom shell of the blade, at least one first radiant element in a leading edge zone of the first mold, and at least a connecting element in contact with a cavity of the first mold and with one electrical terminal of the first radiant element, the connecting element being configured to define a contacting surface in the bottom shell over the first radiant element, in particular over the electrical terminal of the first radiant element, molding the bottom shell, connecting the first electrical terminal of the first radiant element to the first power supply cable, the second electrical terminal of the first radiant element to the second power supply cable, and the lightning down conductor to each power supply cable through the respective surge protection device, depositing in a second mold a plurality of layers or sheets of fabric which will form the upper shell of the blade, including at least one second radiant element in a leading edge area of the second mold, and at least a connecting element in contact with the cavity of the second mold and with a terminal of the second radiant element, the connecting element being configured to define a contacting surface in the upper shell over the second radiant element, in particular over the electrical terminal of the second radiant element, closing both molds against each other, with the connecting element of the first mold and the connecting element of the second mold facing each other, and sealing the upper shell and the bottom shell to each other, removing the blade from the molds and fixing connecting means to the contacting surface of the bottom shell and to the contacting surface of the upper shell, so that the second radiant element is electrically connected to the first radiant element so that the second radiant element is supplied electrically only through the first radiant element.

The method according to embodiments of the invention is more optimized as it allows to integrate the radiant elements during the manufacturing process and to integrate both the lightning protection system and the ice formation preventing system in a simple way during the manufacturing of the blade. A cost reduced method is thus obtained.

BRIEF DESCRIPTION

Some of the embodiments will be described in detail, with reference to the following figures, wherein like designations denote like members, wherein.

DETAILED DESCRIPTION

Figure 1:
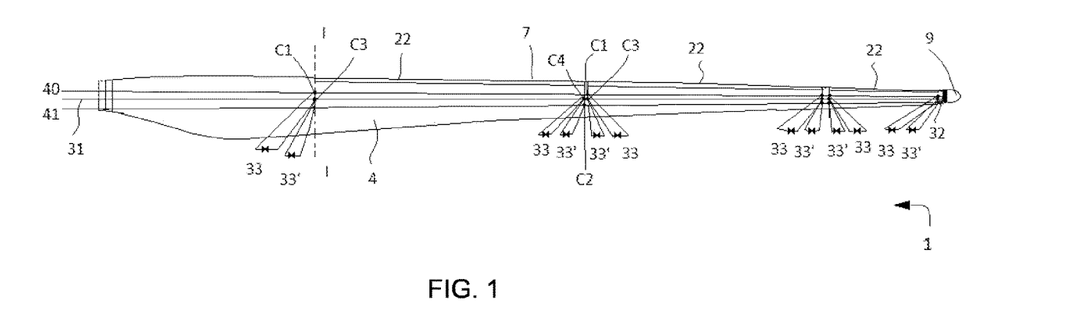
FIG. 1 shows a longitudinal section of a first embodiment of a blade according to embodiments of the invention.

FIG. 1 shows a blade 1 for a wind turbine according to embodiments of the invention comprising an ice formation prevention system 20 and a lightning protection system 30. The ice formation prevention system 20 comprises heating means 21 connected to power supply cables 40 and 41. The heating means 21 comprise at least a first radiant element 22 and at least a second radiant element 26 arranged adjacent to each other around a leading edge 7 of the blade 1 as shown in the figures, with the first radiant element 22 connected to power supply cables 40 and 41 through corresponding electrical connectors 34a and 34b at corresponding connection points C1 and C2. In particular, the first radiant element 22 is connected to the first power supply cable 40 through the first electrical connector 34a at the first connection point C1 and to the second power supply cable 41 through the second electrical connector 34b at the second connection point C2. Each power supply cable 40 and 41 runs lengthwise along the blade 1 inside a bottom shell 4 of the blade 1.

The lightning protection system 30 includes at least one lightning down conductor 31 being configured to conduct to earth lightning strikes to the blade through a hub of the wind turbine (not shown in the figures). The lightning down conductor 31 extends longitudinally to the blade 1 from one end of the blade 1. The lightning down conductor 31 is connected to each of the power supply cables 40 and 41 at the connection points C1 and C2. The lightning protection system 30 also includes a lightning receiver 32 at the tip 9 of the blade 1. This lightning receiver 32 is connected to the lightning down conductor 31.

Figure 2:
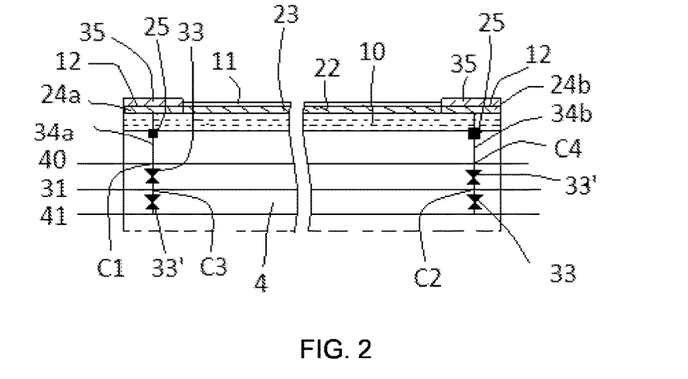
FIG. 2 shows a detail of a first radiant element of the blade shown in FIG. 1.
Figure 3:
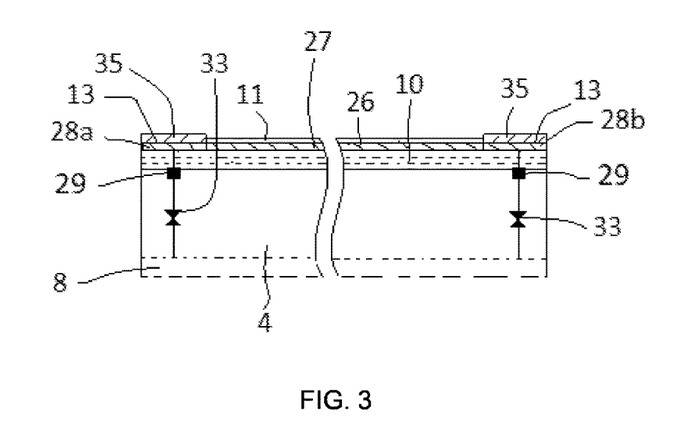
FIG. 3 shows a detail of a second radiant element of the blade shown in FIG. 1.

The blade 1 further comprises surge protection devices 33 (also known as SPD) that connect the ice formation prevention system 20 with the lightning protection system 30, ensuring the equipotentiality of both systems 30 and 20 and avoiding electric arcs. The lightning down conductor 31 is arranged connected to each power supply cable 40 and 41 at the respective connection points C1 and C2 through the respective surge protection device 33. In particular, one surge protector device 33 is connected to the first power supply cable 40 at the first connection point C1 and to the lightning down conductor 31 at a third connection point C3 and other surge protection device 33' is connected to the second power supply cable 41 at the second connection point C2 and to the lightning conductor 31 at a fourth connection point C4 as is shown in FIG. 2.

The second radiant element 26 is not connected to any power supply cables 40 and 41. The second radiant element 26 is electrically connected to the first radiant element 22 in such a way that the second radiant element 26 is only electrically supplied through the first radiant element 22.

The blade 1 comprises a body 2 including an upper shell 3 and a bottom shell 4, and a beam 5. Each radiant element 22 and 26 is arranged in the body 2 around the leading edge 7 in particular the first radiant element 22 is arranged in bottom shell 4 and the second radiant element 26 is arranged in the upper shell 3 so that both radiant elements 22 and 26 are facing each other around the leading edge 7 of the blade 1 but are not in direct contact. The radiant elements 22 and 26 are arranged respectively on the bottom shell 4 and on the upper shell 3. In particular, the radiant elements 22 and 26 are embedded in the corresponding shell 3 and 4, being protected from the outside by an outer coating layer 11 preventing the outer coating layer 11 any short circuit that may occur between both radiant elements 22 and 26 being arranged closed to each other. The power supply cables 40 and 41 are arranged inside the bottom shell 4.

Each radiant element 22 and 26 of the heating means 21 comprises a resistive element 23 and 27 and an electrical terminal 24a, 24b, 28a and 28b at each end of each resistive element 23 and 27. Each electrical terminal 24a, 24b, 28a and 28b is connected to a corresponding metallic block 25 and 29 that ease the electrical connections between the electrical terminals and the corresponding surge protection device 33 or the corresponding electrical connector 34a and 34b. In an embodiment, each metallic block 25 and 29 is embedded in the corresponding shell 3 and 4. In other embodiments, each metallic block 25 and 29 is fixed to the inner surface of the corresponding shell 3 and 4.

The blade 1 comprises conducting means 35 through which the second radiant element 26 is electrically connected to the first radiant element 22. In particular, at least the first terminal 24a of the first radiant element 22 and the first terminal 28a of the second radiant element 26 are arranged connected to each other through the conducting means 35. In an embodiment of the invention, the second terminal 24b of the first radiant element 22 and the second terminal 28b of the second radiant element 26 are arranged also connected to each other through the conducting means 35. The conducting means 35 are not embedded in the blade 1, they are fixed to the radiant elements 22 and 26 in contacting areas 12 and 13 in the upper shell 3 and the bottom shell 4, the radiant elements 22 and 26 not being covered by the outer coating layer 11 in the contacting areas 12 and 13.

In an embodiment of the invention, the conducting means 35 comprise a flat conductor directly connected to the terminals 24a, 24b, 28a and 28b of the radiant elements 22 and 26 respectively. The flat conductor is adhered to contacting areas 12 and 13 of the upper shell 3 and the bottom shell 4.

In another embodiment of the invention, the conducting means 35 comprise a metal mesh directly attached to the terminals 24a, 24b, 28a and 28b of the radiant elements 22 and 26 respectively. The flat conductor is to contacting areas 12 and 13 of the upper shell 3 and the bottom shell 4.

In an embodiment, the blade 1 comprises an additional surge protector device 33' which connects the lightning down conductor 31 with the second power supply cable 41 so that one end of the additional surge protector device 33' is connected to the third connection point C3 and another additional surge protector device 33' which connects the lightning down conductor 31 with the first power supply cable 40 so that one end of the additional surge protector device 33' is connected to the fourth connection point C4.

Each surge protection device 33 and 33', known as SPD, works as a switch that closes during the short time of the surge, i.e., it works as an open switch preventing the passage of current when a certain voltage is not exceeded and it works as a closed switch when a certain voltage is exceeded. When the specified voltage is exceeded, the overvoltage currents can flow to the ground via lightning down conductor 31 or to the supply network via the corresponding power supply cable 40 and 41. This type of short circuit only lasts for the duration of the surge, normally a few microseconds. The surge protection device 33 can be based on a spark gap technology. In other embodiments the surge protection device is based on varistor technology and/or gas discharge tube or other.

In an embodiment, the radiant elements 22 and 26 are resistive elements. In an embodiment, radiant elements 22 and 26 comprise biaxial carbon fabrics.

In an embodiment, the electrical terminals 24a, 24b, 28a and 28b of the radiant elements 22 and 26 are wire meshes, made of copper, attached to the resistive elements 23 and 27.

In an embodiment, the blade 1 is made of carbon fibers, the blade 1 comprising carbon spars 8 which extend longitudinally over the web 5. In these blades 1 made of carbon fibers, one end of the surge protection device 33 is connected to the corresponding carbon spar 8. Similarly, one of the ends of the auxiliary surge protection device 33' is connected to the corresponding carbon spar 8.

In the embodiment shown in FIGS. 4, 5, 8 and 9, the blade 1 is made of carbon fibers as indicated above. The lightning down conductor 31 and the power supply cables 40 and 41 extend along the core 5, in particular they are arranged in the bottom shell 4. The blade 1 includes in the bottom shell 4 one surge protection device 33 connected at one end to the first power supply cable 40 at the first connection point C1 and at the other end to the lightning down conductor 31 at the third connection point C3 and to the carbon spar 8 included in the bottom shell 4.

The blade 1 comprises in the bottom shell 4 another surge protection device 33 connected at one end to the second power supply cable 41 at the second connection point C2 and at the other end to the lightning down conductor 31 at the fourth connection point C4 and to the carbon spar 8 included in the bottom shell 4. In addition, the blade 1 includes an auxiliary surge protection device 33' which is located in the bottom shell 4 and is connected at one end to the second supply cable 41 and at the other end, to the carbon spar 8 and the lightning down conductor 31 located in the bottom shell 4. The blade 1 further comprises metallic blocks 25 and 29 each one fixed in the corresponding inner surface of the bottom shell 4 and of the upper shell 3, the electrical connectors 34a and 34b of the radiant elements 22 and 26 being fixed to the metallic blocks 25 and 29. The first power supply cable 40 is connected to the corresponding metallic block 25 in the bottom shell 4 and the surge protection device 33 is connected to the corresponding metallic block 29 in the upper shell 3.

Finally, the blade 1 comprises in the upper shell 3 a surge protection device 33 connected at one end to the second radiant element 26 and at the other end, to the carbon spar 8.

Figure 5:
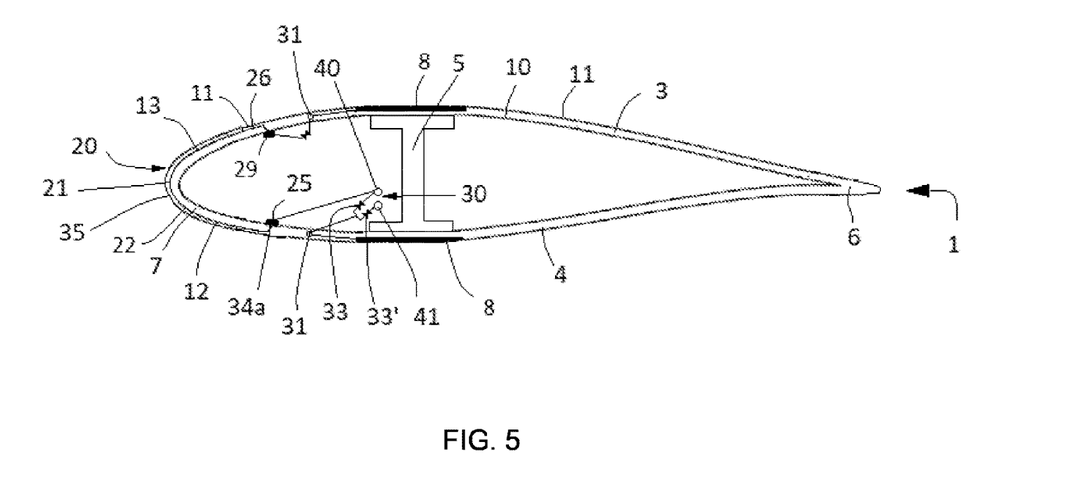
FIG. 5 shows a cross section of a second embodiment of the blade according to embodiments of the invention.

In another embodiment of the invention shown in FIG. 5, the blade 1 is also made of carbon fiber but includes a lightning down conductor 31 in each shell 3 and 4 of the body 2, i.e., it includes a lightning down conductor 31 in the bottom shell 4 and another lightning down conductor 31 in the upper shell 3. The lightning down conductor 31 in the upper shell 3 being connected to the second radiant element 26 through another surge protection device 33, the lightning protection system 30 being equipontentialized in both shells 3 and 4 through the electrical connection between the first radiant element 22 and the second radiant element 26. In an embodiment, both lightning down conductors 31 are embedded in the corresponding shells 3 and 4.

Figure 4:
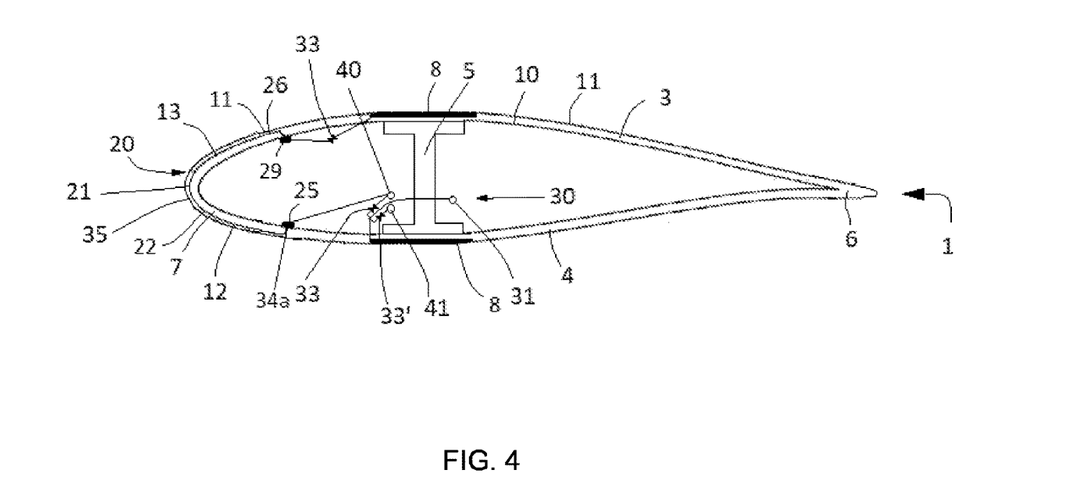
FIG. 4 shows a cross section of the blade shown in FIG. 1 along line I-I.

The electrical connections between the first radiant element 22, the supply cables 40 and 41, the lightning down conductor 31 housed in the bottom shell 4 are analogous to the ones described for the previous embodiment shown in FIG. 4.

In the upper shell 3, one end of the surge protection device 33 is connected to the lightning down conductor 31, the lightning down conductor 31 being also connected to the cap spar 8.

Figure 6:
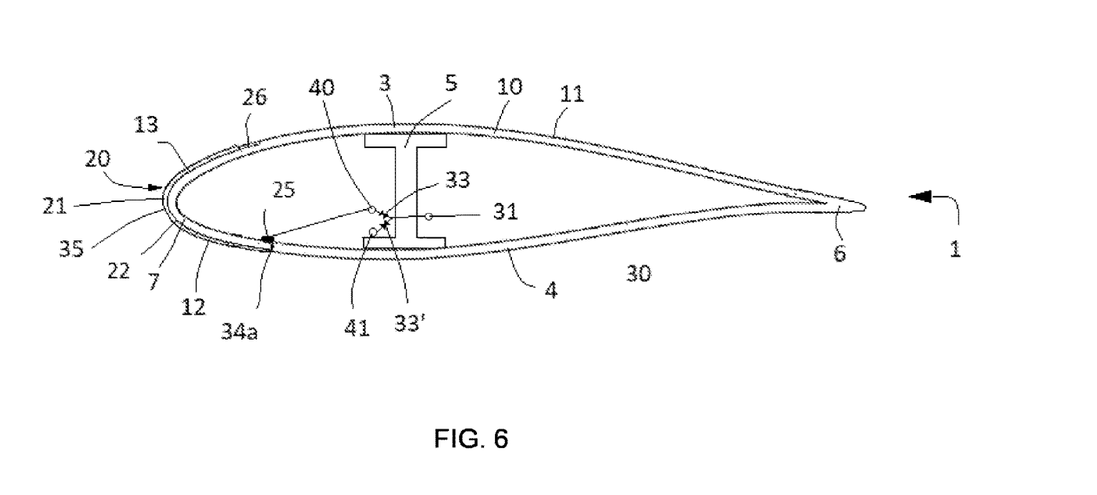
FIG. 6 shows a cross section of a third embodiment of the blade according to embodiments of the invention.
Figure 7:
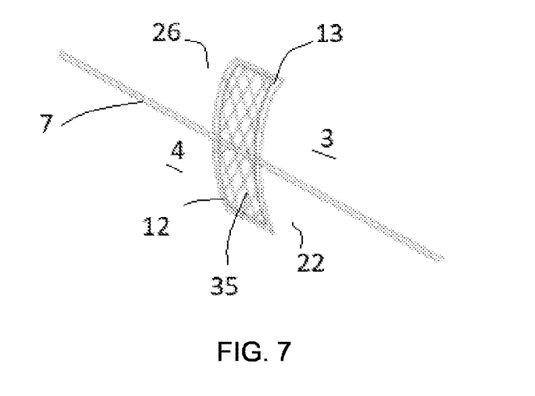
FIG. 7 shows a detail of the blade shown in FIG. 1.

In another embodiment, shown in FIG. 6, the blade 1 is made of glass fibers and does not include carbon sparks. The blade 1 comprises one lightning down conductor 31 and one surge protection device 33 in the bottom shell 4, the surge protection device 33 being connected at one end to the first supply cable 40 at the first connection point C1 and at the other end to the lightning down conductor 31. The blade 1 further comprises an auxiliary surge protection device 33' which is housed in the bottom shell 4, the auxiliary surge protection device 33' being connected at one end to the second supply cable 41 and at the other end to the lightning down conductor 31.

Finally, the heating elements 21 can comprise a plurality of first radiant elements 22 in the bottom shell 4 and a plurality of second radiant elements 26 in the upper shell 3, arranged both radiant elements 22 and 26 along the leading edge 7 of the blade 1 and facing each other. In the embodiments shown in figures, the heating means 21 comprise three first radiant elements 22 and three second radiant elements 26 arranged opposite each other.

Figure 8:
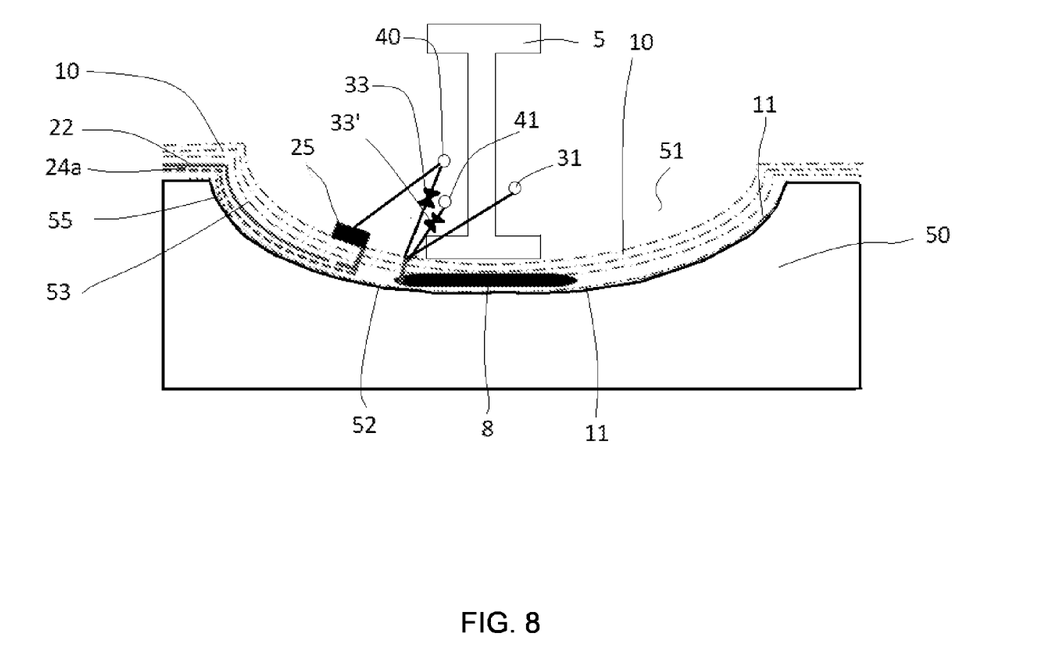
FIG. 8 shows a section of a first mold with a bottom shell of the blade according to embodiments of the invention.
Figure 9:
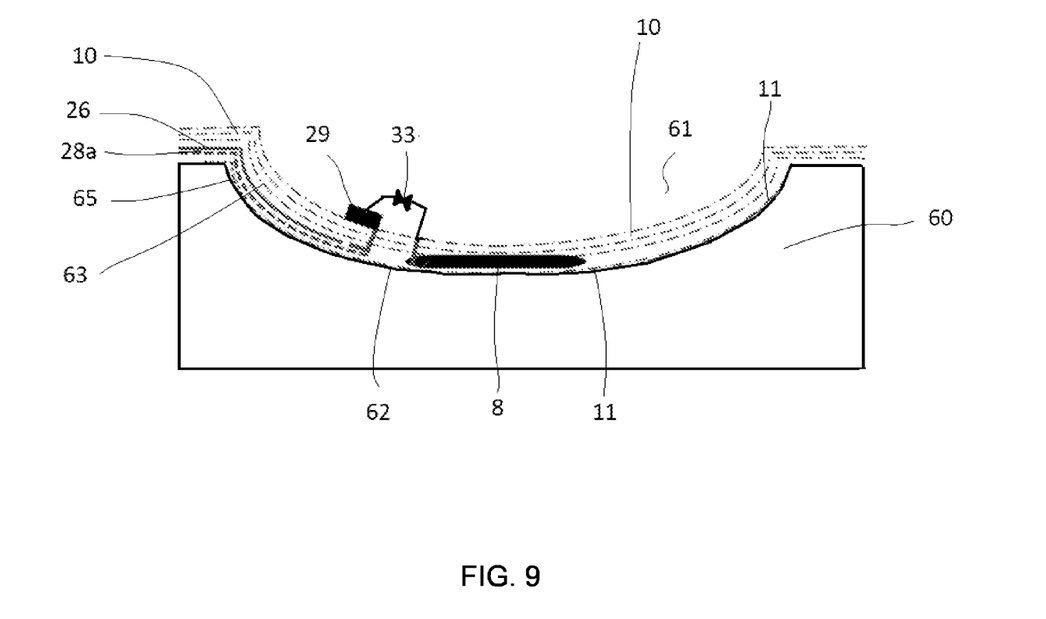
FIG. 9 shows a section of a second mold with a top shell of the blade according to embodiments of the invention.

Another aspect of embodiments of the invention is a method for manufacturing the blade of the features described previously. The method comprises the following steps;
    depositing in a first mold 50 a plurality of layers or sheets of fabric 10 which will form the bottom shell 4 of the blade 1, at least one first radiant element 22 in a leading edge zone 53 of the first mold 50, and at least a connecting element 55 in contact with a cavity 51 of the first mold 50 and with one electrical terminal 24a y 24b of the first radiant element 22, the connecting element 55 being configured to define a contacting surface 12 in the bottom shell 4 over the first radiant element 22, in particular over the electrical terminal 24a and 24b of the first radiant element 22,
    molding the bottom shell 4,
    connecting the first electrical terminal 24a of the first radiant element 22 to the first power supply cable 40, the second electrical terminal 24b of the first radiant element 22 to the second power supply cable 41, and the lightning down conductor 31 to each power supply cable 40, and 41 through the respective surge protection device 33, depositing in a second mold 60 a plurality of layers or sheets of fabric 10 which will form the upper shell 3 of the blade 1, including at least one second radiant element 26 in a leading edge area 63 of the second mold 60, and at least a connecting element 65 in contact with the cavity 61 of the second mold 60 and with a terminal 28a and 28b of the second radiant element 26, the connecting element 65 being configured to define a contacting surface 64 in the upper shell 3 over the second radiant element 26, in particular over the electrical terminal 28a and 28b of the second radiant element 26, closing both molds 50 and 60 against each other, with the connecting element 12 of the first mold 50 and the connecting element 13 of the second mold 60 facing each other, and sealing the upper shell 3 and the bottom shell 4 to each other, removing the blade 1 from the molds 50 and 60, and fixing the conducting means 35 to the contacting surface 55 of the bottom shell 4 and to the contacting surface 65 of the upper shell 3, so that the second radiant element 26 is electrically connected to the first radiant element 22 so that the second radiant element 26 is supplied electrically only through the first radiant element 22.

The leading-edge zone 53 and 63 of the first mold 50 and of the second mold 60 form the leading edge 7 of the blade 1.

Each connecting element 55 and 65 is arranged in a specific area of the corresponding leading-edge zone 53 and 63, generating respective contacting surfaces 12 and 13 on the blade 1. The contacting surfaces 12 and 13 face each other. In each mold 50 and 60, the connecting elements 55 and 65 are arranged in contact with the cavity delimiting surface 52 and 62 of the corresponding cavity 51 and 61 and with the radiant elements 22 and 26.

In the contacting surfaces 12 and 13 the first radiant element 22 and the second radiant element 26 are not covered by the outer coating layer 11 or by any other fibers or fabrics, i.e., they are exposed and visible. In particular, these contact areas 12 and 13 are formed at least on the first terminal 24a of the first radiant element 22 and on the first terminal 28a of the second radiant element 26.

The bottom shell 4 and the upper shell 3 are molded by a vacuum infusion process. Once the plurality of layers or sheets of fabric 10, the first radiant element 22, and the corresponding connecting element 55 are deposited in the cavity 51 and 61, vacuum is applied and resin is infused into the corresponding mold cavity 51 and 61. After curing, the bottom shell 4 and the upper shell 3 are respectively obtained.

In one embodiment, the metallic block 25 and 29 is fixed to the corresponding shell 3 and 4, after the curing, the corresponding radiant element 22 and 26 being connected to the metallic block 25 and 29. In another embodiment, each metallic block 25 and 29 is arranged between the plurality of layers 10, being embedded between them.

In the embodiment shown in FIG. 5, one lightning down conductor 31 is arranged in each mold 50 and 60. The second radiant element 26 is connected to another lightning conductor 31 through another surge protection device 33 housed in the upper shell 3, the lightning protection system 30 being equipontentiallized in both shells 3 and 4 through the conducting means 35. In this embodiment, both lightning down conductors 31 are embedded in the corresponding shell 3 and 4. The corresponding lightning down conductor 31 is connected with the corresponding spar cap 8 before applying vacuum.

Once the bottom shell 4 is molded, the beam 5 is fixed to the bottom shell 4. Subsequently, the power supply cables 40 and 41 are arranged guided along the core 5. The first radiant element 22 is connected to the respective metallic block 25. After that, the electric connections between the corresponding electrical connectors 34a and 34b, the first power cable 40, the second power cable 41, the surge protection devices 33 and 33' and the lightning down conductor 31 are done as have been described previously along the description.

Before closing both molds 50 and 60, the corresponding electrical connections between the first radiant element 22, the power supply cables 40 and 41, the lightning down conductor 31 and the corresponding surge protection devices 33 and 33' are carried out in the first mold 50 as defined before. The electrical connections of the elements housed/included in the upper shell 3 and the ones housed/included in the bottom shell 4 being connected independently one from the other.

Once the blade 1 is demolded, the respective connecting elements 55 and 65 are removed from the corresponding contacting surfaces 12 and 13, being the conducting means 35 fixed on the contacting surfaces 12 and 13.

In an embodiment, each connecting element 55 and 65 has a rectangular geometry, thus generating substantially rectangular contacting surfaces 12 and 13.

In a preferred embodiment, the conducting means 35 are adhered to the contacting surface 12 of the bottom shell 4 and to the contacting surface 13 of the upper housing 3. After the blade 1 is demolded, the conducting means 35 are fixed to the contacting surfaces 12 and 13 by a curing adhesive. In particular, each connecting element 55 and 65 is an adhesive strip, preferably plastic, which placed in each mold 50 and 60 for defining the contacting surfaces 12 and 13, being removed once the blade 1 is removed from the molds 50 and 60. Once the adhesive strip is removed the conducting means 35 are then adhered to the adhesive-impregnated contacting surfaces 12 and 13. In both cases, pressure may be applied on the conducting means 35 for enhancing the fixing process.

In other embodiments, the conducting means 35 can be fixed to the contacting surfaces 12 and 13 by any other known means.

In an embodiment, the layers 10 can be carbon layers or sheets, the first and second molds 50 and 60 housing carbon spars 8 so that the carbon spars 8 are embedded in the blade 1. The carbon spars 8 included in the first mold 50 and second molds 60 are electrically connected to the corresponding surge protection devices 33 and 33' and/or to the lightning down conductor 31 as has been described previously along the description.

In other embodiments in which the blade 1 comprises a plurality of first radiant elements 22 and a plurality of second radiant elements 26, each mold 50 and 60 will include at least one connecting element 55 and 65 for each first radiant element 22 and for each second radiant element 26, being the connecting elements 55 and 65 arranged faced to each other.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A blade for a wind turbine comprising:
   an ice formation prevention system having a heating means connected to power supply cables;
   a lightning protection system including at least one lightning down conductor and configured to conduct lightning striking the blade to ground through the at least one lightning down conductor; and
   surge protection devices that connect the ice formation prevention system with the lightning protection system ensuring an equipotentiality of both systems;
   wherein the heating means comprise at least one first radiant element and at least one second radiant element arranged faced to each other around a leading edge of the blade, with the at least one first radiant element being connected to the power supply cables through respective connectors at respective connection points, and the at least one lightning down conductor is connected to each power supply cable at the respective connection points through a respective surge protection device, the at least one second radiant element being electrically connected to the at least one first radiant element so that the at least one second radiant element is electrically supplied only through the at least one first radiant element.

2. The blade according to claim 1, wherein the at least one first radiant element is arranged on a bottom shell of the blade and the at least one second radiant element is arranged on an upper shell of the blade.

3. The blade according to claim 2, wherein the lightning protection system comprises a further lightning down conductor in the upper shell connected to the at least one second radiant element through a further surge protection device, the at least one down conductor in the bottom shell and the further lightning down conductor in the upper shell being embedded in the corresponding shell, the lightning protection system being equipontentialized in both shells through the electrical connection between the at least one first radiant element and the at least one second radiant element.

4. The blade according to claim 1, comprising a conducting means configured for electrically connecting the at least one second radiant element with the at least one first radiant element.

5. The blade according to claim 4, wherein the at least one first radiant element and the at least one second radiant element comprise respectively a first terminal and a second terminal, with the first terminal and the second terminal of the at least one first radiant element being connected to the first terminal and the second terminal of the at least one second radiant element by the conducting means attached to the corresponding terminals.

6. The blade according to claim 5, wherein the conducting means comprise a flat conductor or a metallic mesh directly attached to the corresponding terminals.

7. The blade according to claim 1, wherein the at least one first radiant element is connected to a first power supply cable at a first connection point, including the blade an additional surge protection device that connects the at least one lightning down conductor with a second power supply cable at the first connection point.

8. The blade according to claim 1, comprising spar caps extending longitudinally, each surge protector device being connected to a respective spar cap.

9. The blade according to claim 1, wherein the heating means comprise a plurality of first radiant elements and a plurality of second radiant elements arranged around the leading edge of the blade.

10. A method for manufacturing a blade for a wind turbine according to claim 1, comprising:
    depositing in a first mold layers or sheets of fabric which form a bottom shell of the blade, the at least one first radiant element in a leading-edge area of the first mold, and at least one connecting element in contact with a cavity of the first mold and with one electrical terminal of the at least one first radiant element, the at least one connecting element being configured to define a contacting surface in the bottom shell over the electrical terminal of the at least one first radiant element;
    molding the bottom shell;
    connecting a first electric terminal of the at least one first radiant element to a first power supply cable, a second electric terminal of the at least one first radiant element to a second power supply cable, and the at least one lightning down conductor to each power supply cable through the respective surge protection device;
    depositing in a second mold a plurality of layers or sheets of fabric which will form an upper shell of the blade, including the at least one second radiant element in a leading edge area of the second mold, and the at least one connecting element in contact with a cavity of the second mold and with one electrical terminal of the at least one second radiant element, the at least one connecting element being configured to define a contacting surface in the upper shell over the electrical terminal of the at least one second radiant element;
    molding the upper shell;
    closing both molds against each other, the at least one connecting element of the first mold and the at least one connecting element of the second mold facing each other, and sealing both shells forming the blade;
    demolding the blade from molds removing the connecting elements; and
    fixing conducting means to contacting surfaces generated by removing the connecting elements so that the at least one second radiant element is supplied electrically only through the at least one first radiant element.

11. The manufacturing method according to claim 10, wherein a metallic block is fixed at least to the bottom shell or is embedded at least in the bottom shell, the at least one first radiant element and the first power supply cable being connected to the metallic block.

12. The manufacturing method according to claim 10, wherein once the upper shell is formed and before closing both molds, the at least one second radiant element is connected to a further lightning down conductor through a further surge protection device housed in the upper shell, the lightning protection system being equipontentialized in both shells through the conducting means.

13. The manufacturing method according to claim 10, wherein in each mold, the connecting elements are arranged in contact with the surface of the corresponding cavity and with the radiant elements.

14. The manufacturing method according to claim 10, wherein the conducting means are adhered to the contacting surfaces by a curing adhesive.

15. The manufacturing method according to claim 10, wherein the at least one connecting element is an adhesive strip which is placed in each mold for defining the contacting surfaces, the connecting elements being removed once the blade is demolded, the conducting means being adhered to the adhesive-impregnated contacting surfaces.

\* \* \* \* \*